Figure 1:
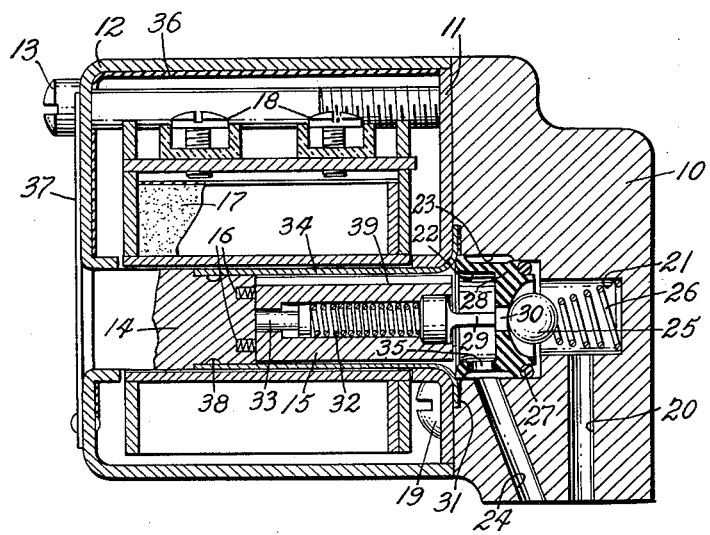

May 14, 1957  B. H. MOSBACHER  2,792,195
SOLENOID VALVE WITH IMPACT TYPE ACTUATOR
Filed Feb. 28, 1950

Bruce H. Mosbacher

United States Patent Office 2,792,195
Patented May 14, 1957

2,792,195

SOLENOID VALVE WITH IMPACT TYPE ACTUATOR

Bruce H. Mosbacher, Rockford, Ill.

Application February 28, 1950, Serial No. 146,851

1 Claim. (Cl. 251—77)

This invention relates to a solenoid valve.

It is an object of this invention to provide a novel and improved solenoid valve.

It is also an object of this invention to provide a solenoid valve of novel construction which has an efficient and advantageous mode of operation.

Other and further objects and advantages of the present invention will be apparent from the following detailed description of a preferred embodiment thereof, which is illustrated in the accompanying drawing.

Figure 2:
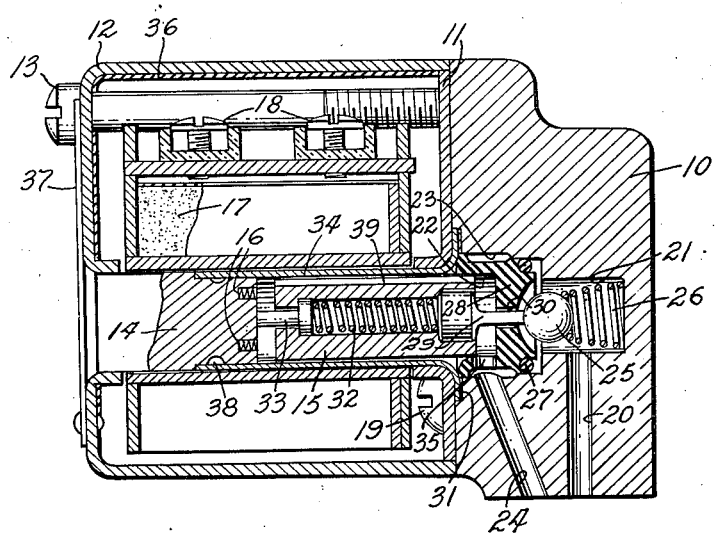

In the drawing:

Figure 1 is a longitudinal section through the present valve with the solenoid energized; and Figure 2 is a similar view showing the positions of the parts when the solenoid is de-energized.

Referring to the drawing, the present valve comprises a valve body 10 having an inlet passage 20, an outlet passage 24 and a valve seat 28 between the inlet and outlet passages. A ball 25 operates in a receiving chamber 21 at the inlet side of the valve seat 28. A compression coil spring 26 normally biases ball 25 to its seated position blocking the passage 30 in the valve seat 28.

An O-ring 27 serves as a seal to prevent leakage of fluid from the receiving chamber 21 to annular chamber 23 when ball 25 is seated on valve seat 28. The chamber 22 at the outlet side of valve seat 28 communicates through an opening 35 with the annular chamber 23, which leads to the outlet passage 24.

For unseating ball 25 there is provided at the outlet side of the valve seat a plunger 29 secured rigidly to the forward end of a reciprocatory armature 15 to move as a unit therewith. Armature 15 is mounted reciprocably in a non-magnetic tube 34. A solenoid coil 17 extends around tube 34 and is provided with terminals 18.

At the remote end of tube 34 is located a pole piece 14, provided with a shading coil 16. This end of tube 34 is soldered at 38 to the pole piece 14. A pin member 33, which is separate from both the pole piece 14 and armature 15, abuts at one end against pole piece 14 and at its other end presents an enlarged head received loosely in an axial recess (not numbered) formed in armature 15. A coil spring 32 located in this recess is under compression between the enlarged head of pin member 33 and plunger 29 so as to bias plunger 29 and armature 15 forward to engage and unseat ball valve 25.

The valve body 10 is secured to a housing 12 and an end plate 11 by means of screws 13 and 19. An electrical insulation strip 36 is provided within housing 12. A gasket 31 is located between the valve body 10 and the flanged forward end of non-magnetic tube 34 to prevent leakage of fluid into solenoid coil 17.

In the operation of this device, when the solenoid coil 17 is energized (Fig. 1) it retracts armature 15 and plunger 29 against the bias of spring 32 until the armature abuts against pole piece 14. A longitudinal groove 39 formed in the periphery of armature 15 permits the escape of any fluid which might be trapped behind the armature Spring 26 and the pressure of the incoming fluid at the receiving chamber 21 seat the ball 25 against the valve seat 28 to block the flow of fluid from the inlet passage 20 to the outlet passage 24. At this time as shown in Fig. 1, the forward end of plunger 29 is spaced from ball 25 and spring 32 is compressed tightly.

To open the valve the solenoid coil 17 is de-energized. When this happens (Fig. 2), the spring 32 forces armature 15 and plunger 29 as a unit forward toward ball 25. Before engaging the ball the plunger 29 first must move through a predetermined distance during which its movement under the impetus of spring 32 is substantially unopposed. Therefore, it has an appreciable momentum when it strikes ball 25 with an impact blow to unseat it. The pressure unbalance on the ball 25 is in a direction to normally urge the ball valve to the closed position. In accordance with the present invention, the force of spring 32 is correlated with the mass of the armature assembly, and the distance through which it moves, so that the force of spring 32 and the inertia of the armature assembly is sufficient to overcome the pressure unbalance on ball 25 and the force of spring 26 acting thereon. Once the ball is unseated, the pressures around ball 25 are equalized. Since the compressive force of spring 32 is greater than that of spring 26, the former spring is operative to hold the armature assembly in the extended position and maintain ball 25 in its open position. By utilizing the momentum of the armature assembly a solenoid of smaller size can be utilized to perform the function of a larger unit.

The present valve may also be used as a "latch-in" type electric-hydraulic relay in which a normal pressure differential between the inlet and outlet chambers will be effective to keep ball 25 seated, even when solenoid 17 is de-energized. However, when this pressure differential drops below a predetermined value, the de-energization of the solenoid will be effective to open the valve, as described.

It is to be understood that, while there has been described in detail and illustrated in the accompanying drawing a particular preferred embodiment of the present invention, various modifications, omissions and refinements which depart from the disclosed embodiment may be adopted without departing from the spirit and scope of this invention.

I claim:

A solenoid valve comprising an inlet chamber for receiving fluid under pressure, an outlet chamber for discharging the fluid from the valve, a valve closure member operative to control the flow of fluid between said chambers, a valve spring biasing said closure member to its closed position blocking communication between said chambers, a solenoid coil, a pole piece disposed within said solenoid coil, an armature of magnetic material slidable within said solenoid coil and adapted to abut at one end against said pole piece, a plunger having a rigid connection to the other end of the armature and positioned at the outlet side of said valve closure member and operative to engage the latter upon movement of the armature away from said pole piece, said armature being formed with an axial chamber and with an axial opening at its end adjacent the pole piece communicating with said axial chamber, a coil spring disposed within said axial chamber in the armature, and a rigid member engaging the pole piece and extending freely through said axial opening in the armature into said axial armature chamber to abut against one end of the coil spring therein, said armature coil spring being under compression between the armature and said rigid member to urge the armature away from engagement with said pole piece to position the plunger in engagement with the valve closure member to urge the latter to open position, the armature in response to energization of the solenoid coil being retracted thereby to a limiting position abutting against said pole piece to position the plunger away from engagement with the valve closure member, the armature upon de-energization of the solenoid coil being moved by said armature coil spring away from the pole piece to move the plunger into engagement with the valve closure member to urge the latter to open position against the force of the valve spring and the fluid pressure at said valve inlet chamber.

References Cited in the file of this patent

UNITED STATES PATENTS

| | | |
|---|---|---|
| 647,026 | Paul | Apr. 10, 1900 |
| 1,444,189 | Key | Feb. 6, 1923 |
| 1,515,353 | Martin | Nov. 11, 1924 |
| 1,944,113 | Shenton | Jan. 16, 1934 |
| 1,967,258 | Podbielniak | July 24, 1934 |
| 2,067,622 | Smith | Jan. 12, 1937 |
| 2,229,499 | Fisette | Jan. 21, 1941 |
| 2,333,261 | Mantz | Nov. 2, 1943 |
| 2,394,103 | Rader | Feb. 5, 1946 |
| 2,458,123 | Wasserlein | Jan. 4, 1949 |

FOREIGN PATENTS

| | | |
|---|---|---|
| 963,987 | France | Jan. 18, 1950 |